United States Patent [19]

Kellerman

[11] Patent Number: 4,782,812
[45] Date of Patent: Nov. 8, 1988

[54] MEAT GRILL

[76] Inventor: Dan Kellerman, 27 Antwerpen Street, Haifa, Israel

[21] Appl. No.: 54,385

[22] Filed: May 26, 1987

[30] Foreign Application Priority Data

Jan. 13, 1987 [IL] Israel .................................... 81237

[51] Int. Cl.[4] .............................................. F24C 1/16
[52] U.S. Cl. .................................. 126/9 A; 126/9 R; 126/25 R; 44/14
[58] Field of Search ................ 126/9 R, 9 A, 25 R; 44/38, 40, 41

[56] References Cited

U.S. PATENT DOCUMENTS

| | | | |
|---|---|---|---|
| 2,918,051 | 12/1959 | Broman | 126/9 A |
| 3,575,156 | 10/1969 | Hosford | 126/25 R |
| 3,892,222 | 7/1975 | Darbo | 126/9 R |
| 4,254,863 | 3/1981 | Kates et al. | 126/9 A X |
| 4,437,862 | 3/1984 | Whang | 44/6 |
| 4,518,394 | 5/1985 | Templin et al. | 44/38 |

FOREIGN PATENT DOCUMENTS 604511  9/1960  Canada .............................. 126/9 A Primary Examiner—Samuel Scott
Assistant Examiner—Allen J. Flanigan
Attorney, Agent, or Firm—Frishauf, Holtz, Goodman & Woodward

[57] ABSTRACT

A meat-grilling device consists of an open metal box and a throw-away fuel pack enclosed in a closed box of wire netting for insertion into the metal box, the top of the wire netting serving as grid. The fuel pack comprises three superposed layers: an uppermost layer of charcoal lumps, an intermediate layer of paraffin-soaked wood shavings, and a lowermost layer of igniter material in the form of crossing paper strips covered with a rapid-igniting material. Two long side walls of the metal box are perforated by air openings which, during transport, are covered by four flat legs. The legs are swivelled into vertical position during grilling so as to distance the box bottom from the ground. The fuel is lighted by a match put through an air opening to the igniter material, which ignites the wood shavings over the entire pack area, and which, in turn, lights the charcoal. The wood shavings are consumed rapidly causing the charcoal layer to drop down remote from the grid, preventing scorching of the meat.

13 Claims, 2 Drawing Sheets

MEAT GRILL

BACKGROUND OF THE INVENTION

The invention relates to a meat grilling device comprising an outer container or tray of a non-combustible material and an expendable pack containing charcoal, a fast burning material, and a highly inflammable igniter, the pack also forming the grid for placing thereon the foodstuff to be grilled.

There exist meat grilling packages for single use, which consist of a metal or cardboard tray filled with charcoal and covered by wire netting. A bottle of fuel or a cube of a solid combustible material is usually supplied together with the package or packed into it. Such package can be taken into the open, placed on the ground, and the coal ignited by using the enclosed fuel or the like, whereafter the meat is placed on the wire netting for grilling.

A similar device is described in U.S. Pat. No. 2,965,096 (BARTON) which comprises an aluminum tray, covered by wire netting and containing pieces of solid coal and a tinder strip threaded among the coal pieces to promote quick and thorough ignition.

A disposable package is described in U.S. Pat. No. 3,385,282 (LIOYD), which comprises an aluminum tray, a cover grill in the form of corrugated aluminum sheet, the tray containing charcoal pieces interspersed with crumpled pieces of paper for the purpose of spreading the fire over the entire coal area.

Another disposable grill package is described in U.S. Pat. No. 4,254,863 (KATES), comprising a non-combustible container, a grid, and several paper packets for insertion into the container, one above the other, the packets containing respectively pieces of paper, pieces of wood, and lumps of charcoal.

Although these packages are handy, they have various drawbacks which the present invention avoids as follows: 1. The metal tray—usually of aluminum-foil—reaches a high temperature owing to its direct contact with the charcoal, and the package can, therefore, not be placed on ground which is covered with ignitable material, such as pine needles. 2. There exists the danger that the bottom of the tray melts or burns owing to contact with the burning coal causing spilling of the coal onto the ground. 3. The upstanding rim of the tray hinders combustion air from reaching the lower coal layers, a reason for poor performance in many instances. 4. Lighting of the coal by pouring fuel over its surface is dangerous, may lead to a general conflagration in a forest, besides being not very convenient. In addition the fumes emitted are mostly of carcinogenic nature. 5. On the other hand, lighting the coal by means of a cube of solid fuel will result in slow progress of the fire through the entire coal mass, since it will start only in one point. 6. And there is the major drawback that the meat is to be placed on the wire netting in direct contact with the glowing coal which frequently leads to burning and scorching of the meat surface, thereby spoiling the taste. The scorched portions also prevent penetration of the heat and thorough grilling.

As stated above, the present invention has the object to obviate all these drawbacks and to provide a grilling device which is readily and instantaneously ignited, does not char the meat, but grills it properly, and is not dangerous while being lighted and handled.

SUMMARY OF THE INVENTION

The grilling device of the invention consists essentially of a box-shaped container or tray of a non-combustible material such as metal sheeting, and a fuel pack enclosed in a rectangular box of wire netting, of a size permitting its ready insertion into the box. The box consists of a flat bottom, opposed side walls, and an open top, whereof two opposed side walls are perforated by air openings. The box further contains four flat legs fastened to the opposed side walls by rivets, which legs cover the air openings in the opposed side walls during transport of the device in order to prevent spilling of coal dust, and which can be swivelled downwards about their fastening rivets to effect distancing of the tray bottom from the ground.

The fuel pack is in block-shape enclosed in a cage of wire netting. It contains an upper layer of lumps of charcoal, a second layer of wood shavings covered with paraffin or another inflammable, but not carcinogenous, material, and a lowermost layer of an igniting material, preferably paper strips covered by an igniter containing a large percentage of potassium chlorate, or another fast igniting material.

The second layer is preferably made of wood shavings which are slightly compressed into block shape and then sprayed with liquid paraffin, but it is important that sufficient air spaces are maintained between the shavings so as to allow air to reach every spot and thus to promote rapid combustion.

As an alternative to the cinder in the form of paper strips, it is proposed to spray continuous strips of the igniting mass onto the underside of the compressed layer of wood shavings. A preferred arrangement of the strips is in the form of two diagonals extending between air openings on opposite side walls of the tray.

In operation, the igniting material is lighted and, in its turn, lights the fast-burning material; the latter—while burning brightly—lights the charcoal over the entire contact surface, whereby the glowing coal transmits the heat to the meat placed on the netting. The fast-burning material is rapidly consumed, and the charcoal subsides into the empty space left by the consumed material, thereby removing the coal surface from the grid and the grilled surface. This is an important feature, since now the meat is out of direct contact with the glowing coal and cannot be burned and scorched.

SHORT DESCRIPTION OF THE DRAWINGS

FIG. 1 is a perspective view of a metal box adapted for placing therein a fuel pack, FIG. 2 is a perspective view of the wire netting for enclosing a fuel pack, FIGS. 3, 4, 5 and 6 show various shapes of a fuel pack, FIG. 7 shows a fuel pack in a metal box, showing the layers of coal, fast-burning material and igniting material through a central portion shown in broken-off state, FIG. 8 shows the complete package of FIG. 7 after combustion of the fast-burning material, ready for use.

FIG. 9 is a plan view of the underside of the layer of wood shavings in the wire netting, showing two intersecting strips of an igniter material sprayed thereon.

DETAILED DESCRIPTION OF THE DRAWINGS

Figure 1:
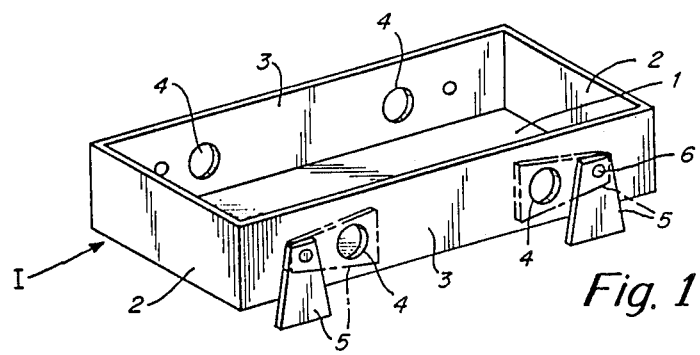
Figure 2:
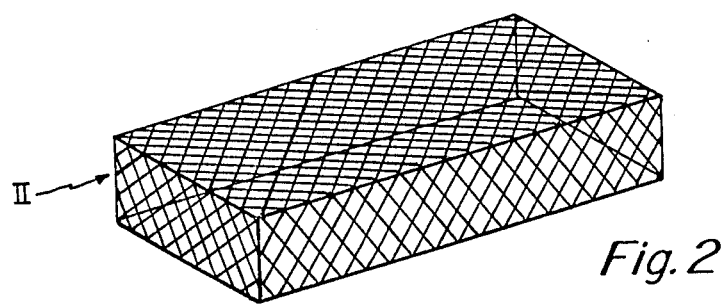
Figure 3:
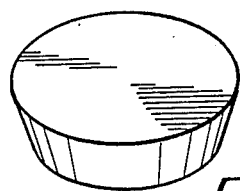
Figure 4:
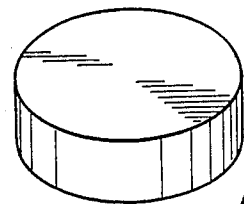
Figure 5:
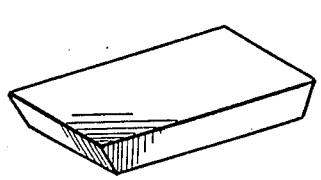
Figure 6:
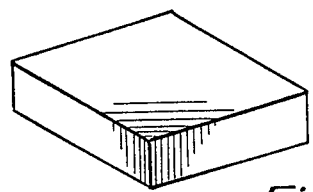

FIGS. 1 and 2 show the major components of the grilling device, i.e. an open-topped metal box I (FIG. 1), into which a net-covered fuel pack II is to be inserted (FIG. 2). The box comprises a bottom 1, two short side walls 2 and two long side walls 3. Each long side wall 3 is perforated by two air openings 4 which serve for inserting a match therethrough for lighting the igniting material adjacent the bottom 1, and for supplying combustion air to the burning charcoal. Four foldable flat legs 5 are attached to the walls 3 by means of rivets 6 which permit turning the legs from their horizontal position adjacent the side walls (shown in broken lines) into their vertical position during use of the device as a grill (shown in full lines). In their horizontal position they cover the openings 4 in order to prevent coal dust or other material from being spilled to the outside.

Figure 7:
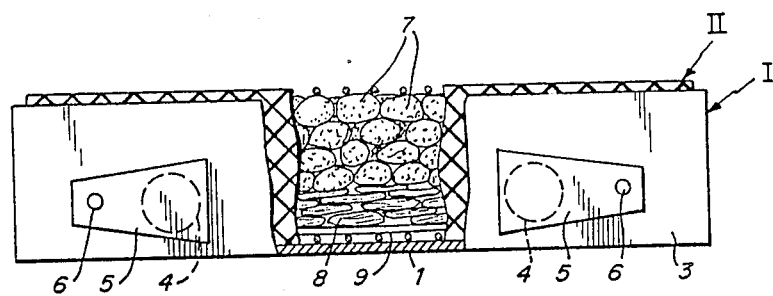
Figure 8:
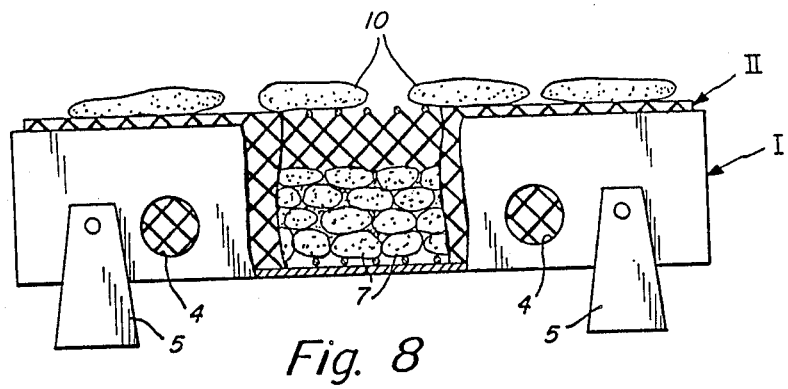
Figure 9:
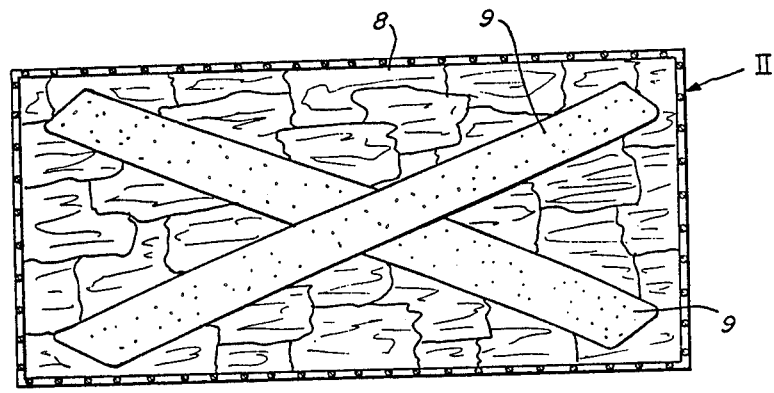

FIG. 2 shows an inverted box of wire netting II before it is filled with combustible material and inserted into the metal box of FIG. 1. The contents of the grilling package are distinctly shown in FIG. 7 which is the suitable position during transport before kindling the combustible material, and FIG. 8 showing it after combustion of the fast-burning material. In order to show the interior, the box I and the wire netting are shown as broken open in their central portion, and the three layers can be clearly distinguished in FIG. 7. There is an upper, thick layer of charcoal 7, an intermediate layer 8 of a fast-burning material such as wood shavings, which may additionally be drenched in paraffin, and a lowermost layer 9 of an igniting material, such as strips of paper covered or soaked in potassium chlorate or another non-carcinogenous material. This layer is preferably in the form of two crossing strips extending diagonally across the bottom of the package, but it could likewise be a rectangular sheet of igniter-covered paper.

Alternatively, the lowermost layer could be in the form of an igniter mass sprayed as two diagonally extending strips onto the underside of the layer of wood shavings.

FIG. 8 shows the grill in action, after the igniting material and the wood-shavings have burnt out, and the coal 7 has subsided to the bottom of the box. It can be clearly seen that there is a predetermined free space left between the surface of the coal and the meat 10 placed on the grid surface, preventing direct contact between coal and meat.

Instead of the box-shaped pack described and illustrated in the foregoing, various other shapes of the pack may be produced, as illustrated in FIGS. 3 through 6. No explanation is required for their understanding.

It will be understood that variations and modifications of the grilling device may be carried out in compliance with the spirit of the invention and the scope of the appended claims.

It is, for instance, proposed to provide the metal box with an additional opening in its bottom for the purpose of facilitating ignition.

Instead of the four air-admission openings 4 shown in the drawings, any other number of openings may be provided, both for pushing a burning match into the contents and for allowing sufficient combustion air to reach the coal.

The main advantage of the present grilling device is that no carcinogenous materials are used for igniting the coal. Another advantage is that it does not require artificial draft, since combustion air can freely reach the coal through the openings 4 in the metal box. The package is easily handled and permits its insertion into the metal box and ignition of the contents in a clean way, without the mess usually experienced with loose charcoal and the different igniting materials gathered in the field.

It is also pointed out that the fuel pack of the present invention represents a complete grilling unit not requiring any additional ingredients. It is a valuable addition to the picknicker's kit, since most people do not know the tricks to have a camp fire going within minutes, while for lighting the present grilling unit the only requirement is a burning match.

The fuel pack is, as said before, for one-time use, while the metal box is a permanent feature to be used in the open or indoors, without any fire risk.

I claim:

1. A grilling device comprising:
   an open box of a non-combustible material,
   a disposable fuel pack of a size permitting its ready insertion into said box,
   said box including a substantially flat bottom, opposed side walls connected to said bottom and an open top, at least two side walls being perforated with air openings,
   said fuel pack including a fuel supply and wire netting completely surrounding said fuel supply, said wire netting including a flat upper surface serving as a grid, said fuel supply including a first upper layer of lumps of charcoal, a second middle layer of wood shavings covered by a readily inflammable material, and a third lowermost layer of an igniting material in the form of strips of a mass containing a high percentage of a fast-igniting and burning material.

2. The grilling device of claim 1, wherein said open box has a substantially rectangular form with a flat bottom, two long and two short side walls perpendicular and connected to said bottom, and said fuel pack has a shape corresponding to the shape of said open box.

3. The grilling device of claim 2, comprising two air openings each perforating said two long side walls.

4. The grilling device of claim 1 wherein said open box is made of sheet metal.

5. The grilling device of claim 2, comprising four flat legs attached to the two long side walls of said open box by means of rivets, thereby permitting swivelling of said legs from a position adjacent said long side walls into a downward directed position so as to support said open box on a surface.

6. The grilling device of claim 5, wherein there are four said openings in said long side walls and said four legs are positioned so that they cover said openings when positioned adjacent said long side walls.

7. The grilling device of claim 1, wherein said second layer of wood shavings is slightly compressed and sprayed with paraffin or the like before insertion into said wire netting.

8. The grilling device of claim 7, wherein said lowermost igniter layer is in the form of two diagonally extending strips of an igniter mass sprayed onto the underside of said layer of wood shavings.

9. The grilling device of claim 1, wherein said lowermost igniter layer is in the form of two diagonally extending paper strips covered by an igniter mass.

10. The grilling device of claim 2 wherein said open box is made of sheet metal.

11. The grilling device of claim 3 wherein said open box is made of sheet metal.

12. The grilling device of claim 1, wherein said igniter mass includes potassium chlorate.

13. The grilling device of claim 9, wherein said igniter mass includes potassium chlorate.

* * * * *